(12) United States Patent
Strzelczyk et al.

(10) Patent No.: US 8,416,060 B2
(45) Date of Patent: Apr. 9, 2013

(54) METHOD AND DEVICE FOR READING RADIO FREQUENCY IDENTIFICATION (RFID) TAGS

(75) Inventors: Martin Strzelczyk, New Market, MD (US); Sean Connolly, Stony Brook, NY (US); Mark Duron, East Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 571 days.

(21) Appl. No.: 12/632,833

(22) Filed: Dec. 8, 2009

(65) Prior Publication Data

US 2011/0133901 A1   Jun. 9, 2011

(51) Int. Cl.
*H04Q 5/22* (2006.01)

(52) U.S. Cl.
USPC ........................ 340/10.1; 340/10.3; 340/572.1

(58) Field of Classification Search .................. None
See application file for complete search history.

(56) References Cited

U.S. PATENT DOCUMENTS

| 5,083,111 | A | * | 1/1992 | Drucker et al. | ............ | 340/572.1 |
| 5,726,630 | A | * | 3/1998 | Marsh et al. | ................. | 340/10.2 |
| 6,734,797 | B2 | | 5/2004 | Shanks et al. | | |
| 6,946,950 | B1 | * | 9/2005 | Ueno et al. | ................... | 340/10.1 |
| 7,423,606 | B2 | | 9/2008 | Knadle, Jr. et al. | | |
| 7,551,140 | B2 | | 6/2009 | Knadle, Jr. et al. | | |
| 2005/0212673 | A1 | * | 9/2005 | Forster | ....................... | 340/572.7 |
| 2010/0060425 | A1 | * | 3/2010 | Rodriguez et al. | ........... | 340/10.1 |

\* cited by examiner

*Primary Examiner* — Jennifer Mehmood
*Assistant Examiner* — Brian Wilson
(74) *Attorney, Agent, or Firm* — Nong-Oiang Fan; Kenneth A. Haas

(57) ABSTRACT

A method and device enables reading radio frequency identification (RFID) tags in a localized area. The method according to one embodiment includes commencing transmission of an interference signal from a reader device (step 505). A command signal is then transmitted from the device while the interference signal is still being transmitted (step 510). The command signal instructs non-target RFID tags to not respond to an interrogation signal, and the target RFID tags do not process the command signal because the command signal is blocked by the interference signal. Transmission of the interference signal from the device is then stopped (step 515). The interrogation signal is then transmitted from the device after the interference signal is no longer being transmitted (step 520). Finally, a response signal is received at the device from the target RFID tags that enables the device to read only the target RFID tags (step 525).

16 Claims, 4 Drawing Sheets

METHOD AND DEVICE FOR READING RADIO FREQUENCY IDENTIFICATION (RFID) TAGS

FIELD OF THE DISCLOSURE

The present invention relates generally to wireless communication devices, and in particular to localized reading of radio frequency identification (RFID) tags using localized interference.

BACKGROUND

Radio frequency identification (RFID) tags are now widely used to mark, inventory and track various products. RFID tags generally transmit to a handheld or robotically controlled reader device a radio frequency signal that includes product information. RFID tags generally include an integrated circuit for storing and processing information, a transceiver for transmitting and receiving RF signals, and an antenna. Some RFID tags are active RFID tags and include their own battery power source. Passive RFID tags do not have their own power source and require receiving a power signal from a reader device to operate. For interrogating passive RFID tags, a reader generally transmits a continuous wave (CW) or modulated radio frequency (RF) signal to a tag. The tag receives the signal, and responds by modulating the signal and then "backscattering" an information response signal to the reader. The reader receives the response signal from the tag, and the response signal is demodulated, decoded and further processed.

Although RFID tags are often read individually or serially, many applications require large groups of RFID tags to be read simultaneously or near simultaneously. For example, crates or pallets including large numbers of products may need to be interrogated using a single RFID reader device. Just one signal from the reader device therefore may be used to activate numerous RFID tags and request information from the tags. Further, such crates or pallets may be adjacent other similar crates or pallets, and activating RFID tags in such adjacent crates or pallets may not be desired. Therefore, use of directional antennas in reader devices and other means for localizing an RFID interrogation signal have been used.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
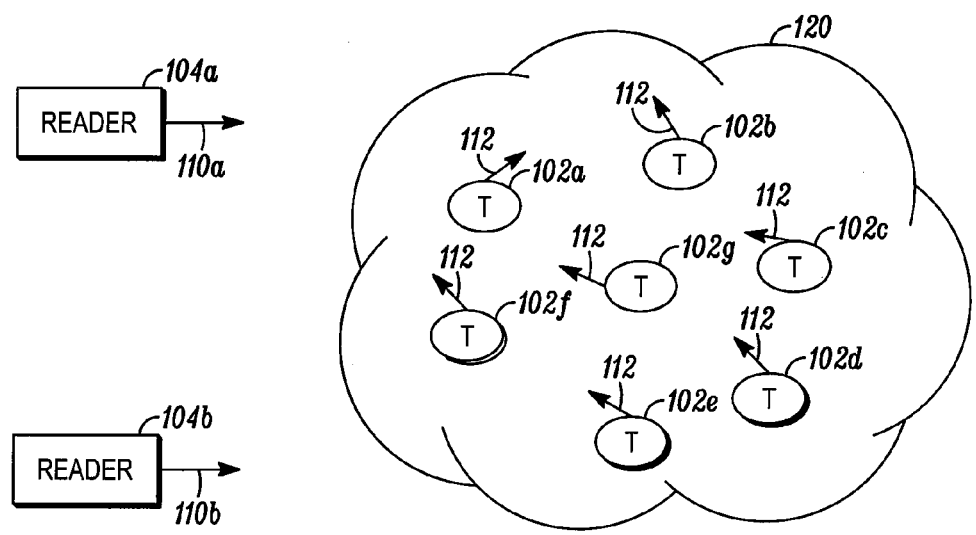
FIG. 1 is a system diagram illustrating an environment where RFID tag readers communicate with an exemplary population of RFID tags, according to an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, a method is provided for reading target radio frequency identification (RFID) tags at an RFID reader device. The method includes commencing transmission of an interference signal from the reader device. A command signal is then transmitted from the reader device while the interference signal is still being transmitted. The command signal instructs non-target RFID tags to not respond to an interrogation signal, and the target RFID tags do not process the command signal because the command signal is blocked by the interference signal. Transmission of the interference signal from the reader device is then stopped. The interrogation signal is then transmitted from the reader device after the interference signal is no longer being transmitted. Finally, a response signal is received at the reader device from the target RFID tags that enables the reader device to read the target RFID tags.

Embodiments of the present invention thus enable the reading of RFID tags within a desired location or range, and without reading tags outside of the desired location or range. Prior art methods for localized reading of RFID tags, such as simply lowering power settings on an RFID reader or adjusting antenna directivity, can lead to unpredictable results. Assertion of range-controlled interference signals according to the present invention provides improved spatial control over RFID tag population readings.

Before describing embodiments of the present invention in detail, it is helpful to describe an example RFID communications environment in which the invention may be implemented. FIG. 1 is a system diagram illustrating an environment 100 where RFID tag readers 104 communicate with an exemplary population 120 of RFID tags 102. As shown, the population 120 of tags includes seven tags 102a-102g. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network.

As shown in FIG. 1, reader 104a transmits an interrogation signal 110 having a carrier frequency to the population of tags 120. Reader 104b transmits an interrogation signal 110b having a carrier frequency to the population of tags 120. Readers 104a and 104b typically operate in one or more of the frequency bands allotted for this type of RF communication. For example, frequency bands of 860-960 MHz, including 902-928 MHz, and 2400-2483.5 MHz have been defined for certain RFID applications by the United States Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternately absorbing and reflecting signal 110 is referred to herein as backscatter modulation. Readers 104a and 104b receive and obtain data from response signals 112, such as an identification number of the responding tag 102. In the embodiments described herein, a reader may be capable of communicating with tags 102 according to any suitable communication protocol, including Class 0, Class 1, Electronic Product Code (EPC) Gen 2, other binary traversal protocols and slotted aloha protocols, any other protocols mentioned elsewhere herein, and future communication protocols.

Figure 2:
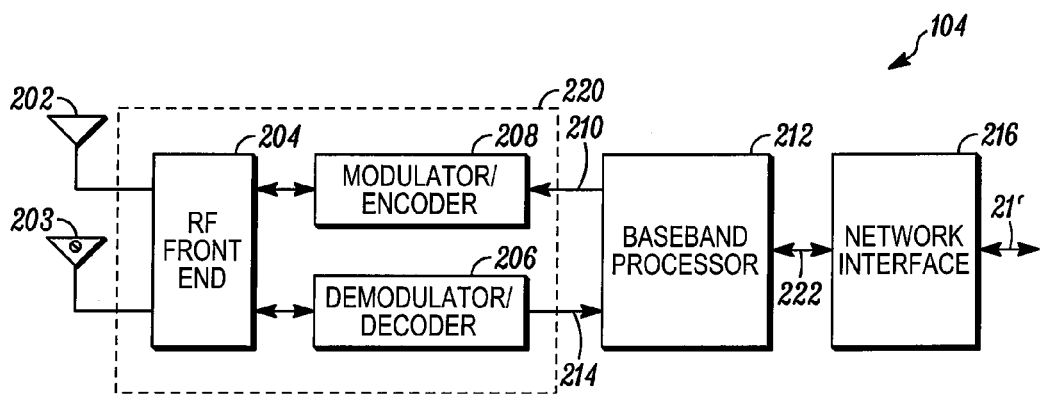
FIG. 2 is a block diagram illustrating some elements of an RFID reader, according to an embodiment of the present invention.

FIG. 2 is a block diagram of an example RFID reader 104. Reader 104 includes a first antenna 202 and a second antenna 203, a receiver and transmitter portion 220 (also referred to as transceiver 220), a baseband processor 212, and a network interface 216. These components of reader 104 may include software, hardware, and/or firmware, or any combination thereof, for performing their functions.

Baseband processor 212 and network interface 216 are optionally present in reader 104. Baseband processor 212 may be present in reader 104, or may be located remote from reader 104. For example, in an embodiment, network interface 216 may be present in reader 104, to communicate between transceiver portion 220 and a remote server that includes baseband processor 212. When baseband processor 212 is present in reader 104, network interface 216 may be optionally present to communicate between baseband processor 212 and a remote server. In another embodiment, network interface 216 is not present in reader 104. The processor 212 also processes computer readable program code components stored in a memory (not shown) of the reader 104 to implement various methods and functions of the reader 104 as described herein.

In an embodiment, reader 104 includes network interface 216 to interface reader 104 with a communications network 218. As shown in FIG. 2, baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver portion 220 transmits the interrogation request via first antenna 202.

Reader 104 has first antenna 202 for communicating with tags 102 and/or other readers 104. First antenna 202 may be any type of reader antenna known to persons skilled in the relevant art, including a vertical, dipole, loop, Yagi-Uda, slot, or patch antenna type. For description of an example antenna suitable for reader 104, refer to U.S. Pat. No. 7,551,140, titled "Low Return Loss Rugged RFID Antenna," issued 23 Jun. 2009, which is incorporated by reference herein in its entirety.

Transceiver 220 receives a tag response via first antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In some embodiments, network interface 216 enables a wired and/or wireless connection with communications network 218. For example, network interface 216 may enable a wireless local area network (WLAN) link (including an Institute of Electrical and Electronics Engineers (IEEE) 802.11 WLAN standard link), a BLUETOOTH (Registered Trademark) link, and/or other types of wireless communication links. Communications network 218 may be a local area network (LAN), a wide area network (WAN) (e.g., the Internet), and/or a personal area network (PAN).

In embodiments, a variety of mechanisms may be used to initiate an interrogation request by reader 104. For example, an interrogation request may be initiated by a remote computer system/server that communicates with reader 104 over communications network 218. Alternatively, reader 104 may include a finger-trigger mechanism, a keyboard, a graphical user interface (GUI), and/or a voice activated mechanism with which a user of reader 104 may interact to initiate an interrogation by reader 104.

In the example of FIG. 2, transceiver portion 220 includes a radio frequency (RF) front-end 204, a demodulator/decoder 206, and a modulator/encoder 208. These components of transceiver 220 may include software, hardware, and/or firmware, or any combination thereof, for performing their functions. An example description of these components is provided as follows.

Modulator/encoder 208 receives interrogation request 210, and is coupled to an input of RF front-end 204. Modulator/encoder 208 encodes interrogation request 210 into a signal format, modulates the encoded signal, and outputs the modulated encoded interrogation signal to RF front-end 204. For example, pulse-interval encoding (PIE) may be used in a Gen 2 embodiment. Furthermore, double sideband amplitude shift keying (DSB-ASK), single sideband amplitude shift keying (SSB-ASK), or phase-reversal amplitude shift keying (PR-ASK) modulation schemes may be used in a Gen 2 embodiment. Note that in an embodiment, baseband processor 212 may alternatively perform the encoding function of modulator/encoder 208.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to first antenna 202 to be radiated. Furthermore, RF front-end 204 receives a tag response signal through first antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214.

Note that in an embodiment, baseband processor 212 may alternatively perform the decoding function of demodulator/decoder 206.

The configuration of transceiver 220 shown in FIG. 2 is provided for purposes of illustration, and is not intended to be limiting. Transceiver 220 may be configured in numerous ways to modulate, transmit, receive, and demodulate RFID communication signals, as is known to persons skilled in the relevant art(s).

Figure 3:
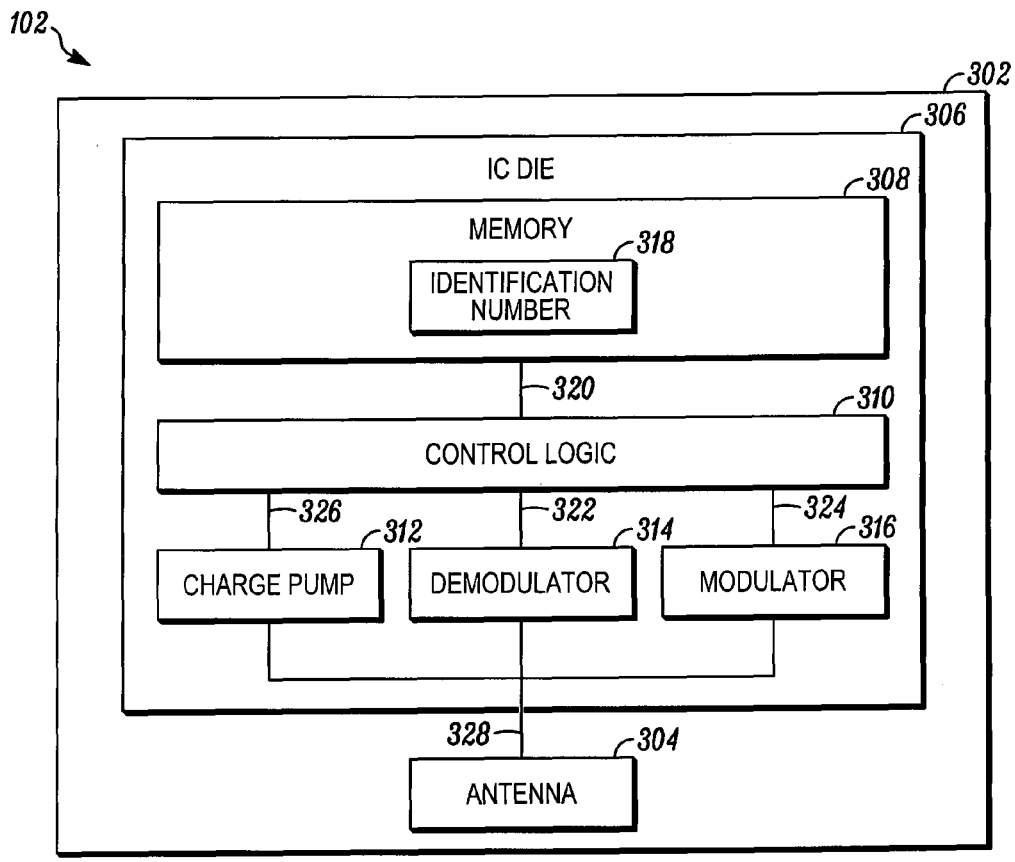
FIG. 3 is a block diagram illustrating some elements of an RFID tag, according to an embodiment of the present invention.

The present invention is applicable to any type of RFID tag. FIG. 3 shows a block diagram of a radio frequency identification (RFID) tag 102. Tag 102 includes a substrate 302, an antenna 304, and an integrated circuit (IC) 306. Antenna 304 is formed on a surface of substrate 302. Antenna 304 may include any number of one, two, or more separate antennas of any suitable antenna type, including dipole, loop, slot, or patch antenna type. IC 306 includes one or more integrated circuit chips/dies, and can include other electronic circuitry. IC 306 is attached to substrate 302, and is coupled to antenna 304. IC 306 may be attached to substrate 302 in a recessed and/or non-recessed location.

IC 306 controls operation of tag 102, and transmits signals to, and receives signals from RFID readers using antenna 304. In the example embodiment of FIG. 3, IC 306 includes a memory 308, a control logic 310, a charge pump 312, a demodulator 314, and a modulator 316. An input of charge pump 312, an input of demodulator 314, and an output of modulator 316 are coupled to antenna 304 by antenna signal 328. Note that in the present disclosure, the terms "lead" and "signal" may be used interchangeably to denote the connection between elements or the signal flowing on that connection.

Memory 308 is typically a non-volatile memory, but can alternatively be a volatile memory, such as a DRAM. Memory 308 stores data, including an identification number 318. Identification number 318 typically is a unique identifier (at least in a local environment) for tag 102. For instance, when tag 102 is interrogated by a reader (e.g., receives interrogation signal 110 shown in FIG. 1), tag 102 may respond with identification number 318 to identify itself. Identification number 318 may be used by a computer system to associate tag 102 with its particular associated object/item.

Demodulator 314 is coupled to antenna 304 by antenna signal 328. Demodulator 314 demodulates a radio frequency communication signal (e.g., interrogation signal 110) on antenna signal 328 received from a reader by antenna 304. Control logic 310 receives demodulated data of the radio frequency communication signal from demodulator 314 on input signal 322. Control logic 310 controls the operation of RFID tag 102 based on internal logic, the information received from demodulator 314, and the contents of memory 308. For example, control logic 310 accesses memory 308 via a bus 320 to determine whether tag 102 is to transmit a logical "1" or a logical "0" (of identification number 318) in response to a reader interrogation. Control logic 310 outputs data to be transmitted to a reader (e.g., response signal 112) onto an output signal 324. Control logic 310 may include software, firmware, and/or hardware, or any combination thereof. For example, control logic 310 may include digital circuitry, such as logic gates, and may be configured as a state machine in an embodiment.

Modulator 316 is coupled to antenna 304 by antenna signal 328, and receives output signal 324 from control logic 310. Modulator 316 modulates data of output signal 324 (e.g., one or more bits of identification number 318) onto a radio frequency signal (e.g., a carrier signal transmitted by reader 104) received via antenna 304. The modulated radio frequency signal is response signal 112, which is received by reader 104. In an embodiment, modulator 316 includes a switch, such as a single pole, single throw (SPST) switch. The switch changes the return loss of antenna 304. The return loss may be changed in any of a variety of ways. For example, the RF voltage at antenna 304 when the switch is in an "on" state may be set lower than the RF voltage at antenna 304 when the switch is in an "off" state by a predetermined percentage (e.g., 30 percent). This may be accomplished by any of a variety of methods known to persons skilled in the relevant art. Modulator 316 and demodulator 314 may be referred to collectively as a "transceiver" of tag 102.

Charge pump 312 is coupled to antenna 304 by antenna signal 328. Charge pump 312 receives a radio frequency communication signal (e.g., a carrier signal transmitted by reader 104) from antenna 304, and generates a direct current (DC) voltage level that is output on a tag power signal 326. Tag power signal 326 is used to power circuits of IC die 306, including control logic 320.

In an embodiment, charge pump 312 rectifies the radio frequency communication signal of antenna signal 328 to create a voltage level. Furthermore, charge pump 312 increases the created voltage level to a level sufficient to power circuits of IC die 306. Charge pump 312 may also include a regulator to stabilize the voltage of tag power signal 326. Charge pump 312 may be configured in any suitable way known to persons skilled in the relevant art. For description of an example charge pump applicable to tag 102, refer to U.S. Pat. No. 6,734,797, titled "Identification Tag Utilizing Charge Pumps for Voltage Supply Generation and Data Recovery," which is incorporated by reference herein in its entirety. Alternative circuits for generating power in a tag are also applicable to embodiments of the present invention.

It will be recognized by persons skilled in the relevant art(s) that tag 102 may include any number of modulators, demodulators, charge pumps, and antennas. Tag 102 may additionally include further elements, including an impedance matching network and/or other circuitry. Embodiments of the present invention may be implemented in tag 102, and in other types of tags.

Embodiments described herein are applicable to all forms of tags, including tag "inlays" and "labels." A "tag inlay" or "inlay" is defined as an assembled RFID device that generally includes an integrated circuit chip (and/or other electronic circuit) and antenna formed on a substrate, and is configured to respond to interrogations. A "tag label" or "label" is generally defined as an inlay that has been attached to a pressure sensitive adhesive (PSA) construction, or has been laminated, and cut and stacked for application. One form of a "tag" is a tag inlay that has been attached to another surface, or between surfaces, such as paper, cardboard, etc., for attachment to an object to be tracked, such as an article of clothing, etc.

Example embodiments of the present invention are described in further detail below. Such embodiments may be implemented in the environments, readers, and tags described above, and/or in alternative environments and alternative RFID devices.

Figure 4:
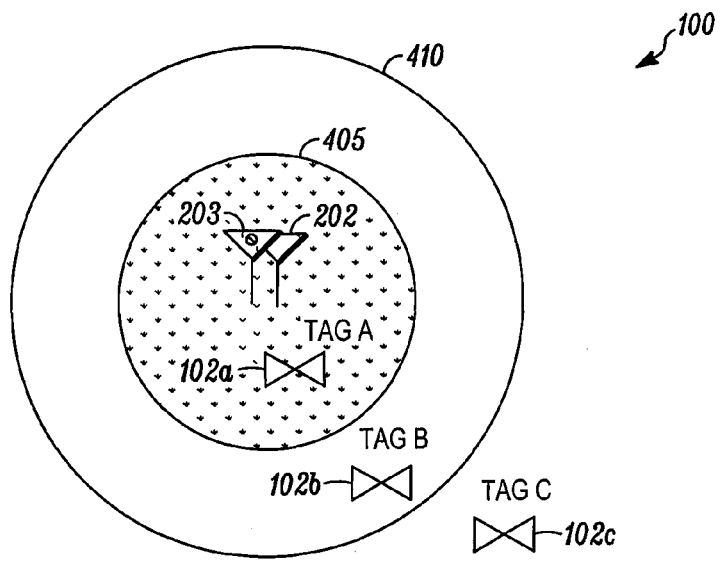
FIG. 4 is a plan view of the environment shown in FIG. 1 and further illustrates relative distances between the antennas of a reader and the RFID tags, according to an embodiment of the present invention.

FIG. 4 is a plan view of the environment 100 further illustrating relative distances between the antennas 202, 203 of a reader 104 and the RFID tags 102a, 102b, and 102c. Inner circle 405 illustrates an RF range of the second antenna 203, and outer circle 410 illustrates an RF range of the first antenna 202. As described in detail below, the first antenna 202 and second antenna 203 cooperate to define a desired range within which localized interrogations of tags 102 can occur.

For example, consider that among the tags 102 in the population 120 a user may seek to interrogate only tags 102 that are within a two meter radius of the reader 104. A range for an interference signal to be transmitted from the second antenna 203 is then set to two meters. In both FIG. 2 and FIG. 4 a "no" symbol is marked on the second antenna 203 to indicate that the second antenna 203 is a source of interference signals.

The inner circle 405 and the outer circle 410 are concentric, thus suggesting that the first antenna 202 and the second antenna 203 are at least approximately co-located at a single point. However, according to some alternative embodiments, first and second antennas may not be co-located. That may be a precondition in systems where signals combine in an additive manner at a tag receiver.

In FIG. 4 consider that the inner circle 405 has a radius of two meters, and the outer circle 410 has a radius of four meters. To read tags 102 within a two meter radius, which in the example shown includes only tag 102a, the reader 104 first transmits from the second antenna 203 an interference signal that extends to the inner circle 405. While the interference signal is being broadcast, any tag 102 within range of the interference signal will not be able to receive other signals. An interferer may couple to a tag 102 through near-field effects (e.g., either inductively or capacitively) with the benefit that these effects diminish more rapidly with distance than far-field radiation. That results in more well-defined boundaries that are more likely to resemble the inner circle 405 in FIG. 100 in an actual realization.

While the interference signal is being transmitted, the reader 104 then transmits a command signal that instructs all tags 102 to not respond to a subsequent interrogation signal. Consider for example that the command signal is transmitted at a range of four meters extending to the outer circle 410. Because of the interference signal, the tag 102a will not "hear" the command signal, and thus the tag 102a will remain prepared to respond to a subsequent interrogation signal. Because it is out of range of the command signal, the tag 102c will also not "hear" the command signal. As will be understood by those having ordinary skill in the art, the command signal may comprise, for example, a Select command that conforms to an Electronic Product Code (EPC) class 1 generation 2 ultra high frequency (UHF) air interface protocol standard.

Next, the reader 104 stops transmission of the interference signal. The reader 104 then begins transmission of an interrogation signal that has a range of four meters and extends to the outer circle 410. Both the tag 102a and the tag 102b will receive the interrogation signal; however, because the tag 102b also received the command signal, the tag 102b will not respond to the interrogation signal. Therefore, only the tag 102a, which is the only tag 102 within the intended two meter interrogation range, will respond to the interrogation signal with a response signal that enables the reader 104 to read the tag 102a. For example, the reader 104 may receive the identification number 318 of the tag 102a in the response signal. Although FIG. 4 shows only three tags 102a, 102b, 102c for purposes of illustration and clarity, those having ordinary skill in the art will appreciate that actual examples of the present invention may include numerous tags 102 inside a range of an interference signal, numerous tags 102 outside a range of an interference signal but inside a range of an interrogation signal, and numerous tags outside a range of an interrogation signal.

According to an alternative embodiment, referring again to FIG. 4, consider that a reader 104 commences transmission of an interference signal broadcast from the second antenna 203, where the interference signal has a range extending to the inner circle 405. Next, while the interference signal is still being transmitted, a first interrogation signal is transmitted from the reader 104 using the first antenna 202, which interrogation signal has a range extending to the outer circle 410. A plurality of first response signals are then received at the reader 104 from a first set of non-target RFID tags, which first set as shown includes the tag 102b and any other tag 102 within the outer circle 410 but outside the inner circle 405.

Transmission of the interference signal is then stopped. Next, a second interrogation signal is transmitted from the reader 104 using the first antenna 202 after the transmission of the interference signal stops. A plurality of second response signals is then received at the reader 104 from a second set of non-target and target RFID tags, which second set includes the tags 102a, 102b, and any other tag 102 within the outer circle 410. Only target tags 102 within the inner circle 405 are then read and processed by the reader 104 by reading only tags 102 included only in the second set and not in the first set.

Using mathematical set notation, the above can be described by defining the first set as set B, the second set as set A⊔M, where the target RFID tags 102 (i.e., those within the inner circle 405) consist of set A, and where A=A⊔B−((A⊔M)∩B).

Figure 5:
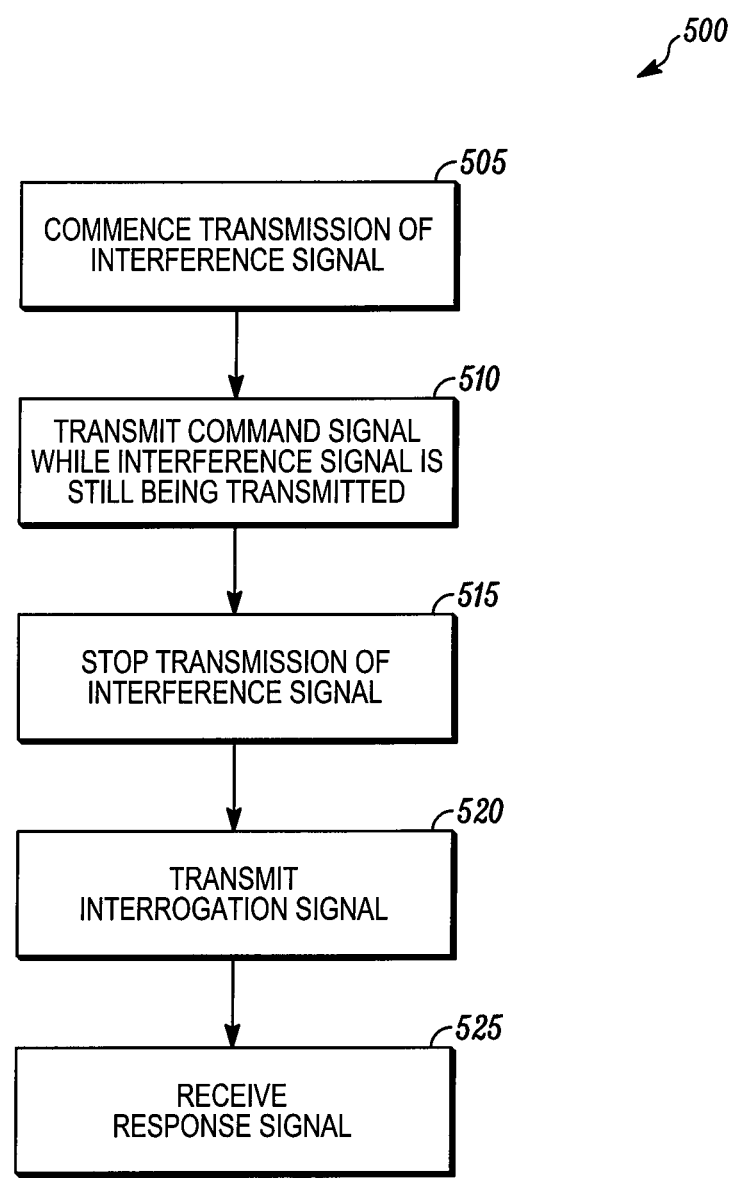
FIG. 5 is a flow diagram illustrating a method for reading a target RFID tag at an RFID reader device, according to an embodiment of the present invention.

FIG. 5 is a flow diagram illustrating a method 500 for reading a target RFID tag at an RFID reader device, according to one embodiment of the present invention. At step 505, transmission of an interference signal is commenced from the reader device. For example, as described above, an interference signal having a range extending to the inner circle 405 of FIG. 4 is transmitted from the second antenna 203.

At step 510, a command signal is transmitted from the reader device while the interference signal is still being transmitted, whereby the command signal instructs non-target RFID tags to not respond to an interrogation signal, and whereby the target RFID tag does not process the command signal because the command signal is blocked by the interference signal. For example, consider that target RFID tags 102 are inside the inner circle 405 and non-target RFID tags 102 are outside the inner circle 405, and the command signal is a Select command transmitted from the first antenna 202 at a range extending to the outer circle 410.

At step 515, transmission of the interference signal from the reader device is stopped. For example, the interference signal from the second antenna 203 is stopped.

At step 520, the interrogation signal is transmitted from the reader device after the interference signal is no longer being transmitted. For example the interrogation signal from the first antenna 202 is transmitted after the interference signal from the second antenna 203 stops.

At step 525, a response signal is received at the reader device from the target RFID tag that enables the reader device to read the target RFID tag. For example, a response signal is received at the reader 104 from the tag 102a that enables the reader 104 to read the identification number 318 or other data from the tag 102a.

Figure 6:
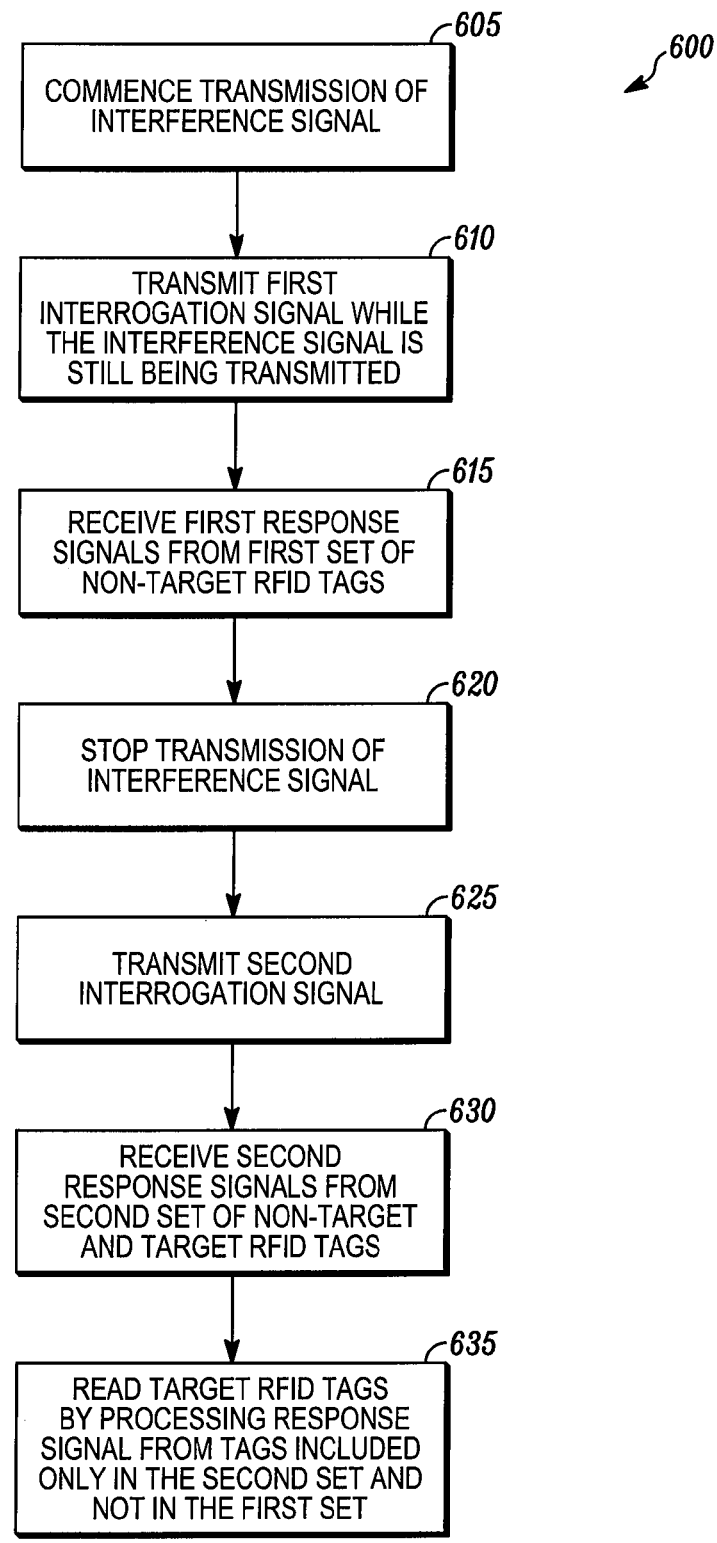
FIG. 6 is a flow diagram illustrating a method for reading target RFID tags at an RFID reader device, according to an alternative embodiment of the present invention.

FIG. 6 is a flow diagram illustrating a method 600 for reading a target RFID tag at an RFID reader device, according to an alternative embodiment of the present invention. At step 605, transmission of an interference signal is commenced from the reader device.

At step 610, a first interrogation signal is transmitted from the reader device while the interference signal is still being transmitted.

At step 615, in response to the first interrogation signal, a plurality of first response signals are received at the reader device from a first set of non-target RFID tags.

At step 620, transmission of the interference signal from the reader device is stopped.

At step 625, a second interrogation signal is transmitted from the reader device after transmission of the interference signal stops.

At step 630, in response to the second interrogation signal, a plurality of second response signals are received at the reader device from a second set of non-target and target RFID tags; and At step 635, the target RFID tags are read by processing at the RFID reader device response signals from RFID tags included only in the second set and not in the first set.

Advantages of some embodiments of the present invention therefore include enabling the reading of RFID tags within a desired location or range, and without reading tags outside of the desired location or range. The assertion of range-controlled interference signals as described herein provides improved spatial control over RFID tag population readings.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element preceded by "comprises a . . . ", "has a . . . ", "includes a . . . ", or "contains a . . . " does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for reading a target radio frequency identification (RFID) tag at an RFID reader device, the method comprising:
   commencing transmission of an interference signal from the reader device;
   transmitting a do not respond command signal from the reader device while the interference signal is still being transmitted, whereby the do not respond command signal instructs non-target RFID tags to not respond to an interrogation signal, and wherein the target RFID tag does not process the do not respond command signal because the do not respond command signal is blocked by the interference signal;
   stopping transmission of the interference signal from the reader device;
   transmitting the interrogation signal from the reader device after the interference signal is no longer being transmitted; and
   receiving a response signal at the reader device from the target RFID tag that enables the reader device to read the target RFID tag wherein RFID tags respond to the interrogation signal unless a do not respond command signal has been received by the RFID tag.

2. The method of claim 1, wherein the interrogation signal is transmitted at a higher power level than the interference signal.

3. The method of claim 1, wherein after the interrogation signal is transmitted a plurality of response signals are received at the reader device from a plurality of target RFID tags.

4. The method of claim 1, wherein the do not respond command signal comprises a Select command that conforms to an Electronic Product Code (EPC) Class 1 Generation 2 Ultra High Frequency (UHF) Air Interface Protocol Standard.

5. The method of claim 4, wherein in the Select command comprises a specific, low-probability match field.

6. The method of claim 1, wherein the interference signal, do not respond command signal, interrogation signal, and response signal are all within the range of 860MHz to 960MHz or 2400MHz to 2483.5MHz.

7. A method for reading target radio frequency identification (RFID) tags at an RFID reader device, the method comprising:
   commencing transmission of an interference signal from the reader device;
   transmitting a first interrogation signal from the reader device while the interference signal is still being transmitted, wherein the interference signal interferes with the first interrogation signal;
   receiving at the reader device, in response to the first interrogation signal, a plurality of first response signals from a first set of non-target RFID tags;
   stopping transmission of the interference signal from the reader device;
   transmitting a second interrogation signal from the reader device after transmission of the interference signal stops;
   receiving at the reader device, in response to the second interrogation signal, a plurality of second response signals from a second set of non-target and target RFID tags; and
   reading the target RFID tags by processing at the RFID reader device response signals from RFID tags included only in the second set and not in the first set;
   wherein RFID tags respond to the interrogation signal unless they have been interfered with by the interference signal.

8. The method of claim 7, wherein the first set can be defined as set B, the second set can be defined as set A∪B, and the target RFID tars consist of set A, wherein A=A∪B−((A∪B)∩B).

9. A reader device for reading a target radio frequency identification (RFID) tag, the device comprising:
   a transceiver; and
   a processor operatively coupled to the transceiver and to a memory, wherein the memory includes:
      computer readable program code components for commencing transmission of an interference signal from the transceiver;
      computer readable program code components for transmitting a do not respond command signal from the transceiver while the interference signal is still being transmitted, whereby the do not respond command signal instructs non-target RFID tags to not respond to an interrogation signal, and whereby the target RFID tag does not process the do not respond command signal because the do not respond command signal is blocked by the interference signal;
      computer readable program code components for stopping transmission of the interference signal from the transceiver;
      computer readable program code components for transmitting the interrogation signal from the transceiver after the interference signal is no longer being transmitted; and
      computer readable program code components for receiving a response signal at the transceiver from the target RFID tag that enables the reader device to read the target RFID tag;
      wherein RFID tags respond to the interrogation signal unless a do not respond command signal has been received by the RFID tag.

10. The device of claim 9, wherein the interrogation signal is transmitted at a higher power level than the interference signal.

11. The device of claim 9, wherein after the interrogation signal is transmitted a plurality of response signals are received at the reader device from a plurality of target RFID tags.

12. The device of claim 9, wherein the do not respond command signal comprises a Select command that conforms to an Electronic Product Code (EPC) Class 1 Generation 2 Ultra High Frequency (UHF) Air Interface Protocol Standard.

13. The device of claim 12, wherein in the Select command comprises a specific, low-probability match field.

14. The device of claim 9, wherein the interference signal, do not respond command signal, interrogation signal, and response signal are all within the range of 860MHz to 960MHz or 2400MHz to 2483.5MHz.

15. The device of claim 9, further comprising a first antenna for transmitting the do not respond command signal and a second antenna for transmitting the interference signal.

16. The device of claim 15, wherein the first antenna and the second antenna are not co-located.

* * * * *